United States Patent [19]

Elliott et al.

[11] 4,331,924
[45] May 25, 1982

[54] PULSE RATE MULTIPLYING CIRCUITRY

[76] Inventors: Kenneth D. Elliott, P.O. Box 31227, Cincinnati, Ohio 45231; Peter F. Elliott, 673 Bunker Hill Rd., Houston, Tex. 77024

[21] Appl. No.: 151,285

[22] Filed: May 19, 1980

[51] Int. Cl.³ .................. H03B 19/00; H03K 5/00
[52] U.S. Cl. .................. 328/38; 307/225 R; 235/92 DM
[58] Field of Search ............ 328/38, 16; 235/92 DM; 307/225 R

[56] References Cited

U.S. PATENT DOCUMENTS

| | | | |
|---|---|---|---|
| 3,411,102 | 11/1968 | Sommerud et al. | 328/38 X |
| 3,617,902 | 11/1971 | Bauer | 328/38 |
| 3,673,391 | 6/1972 | Lougheed | 235/92 DM |
| 3,935,538 | 1/1976 | Kizler et al. | 328/38 |
| 4,053,839 | 10/1977 | Knoedl | 328/38 |
| 4,086,471 | 4/1978 | Takahashi | 235/92 DM |

*Primary Examiner*—John S. Heyman
*Attorney, Agent, or Firm*—Wood, Herron & Evans

[57] ABSTRACT

Pulse rate multiplying circuitry is responsive to an input pulse train for generating an output pulse train having a number of pulses which is a selected multiple of the number of pulses in the input pulse train. That is, the pulse rate multiplying circuitry produces exactly a selected multiple of output pulses for each input pulse so that the frequency of the output pulse train is the selected multiple of the frequency of the input pulse train. Preferably, the pulses in the output pulse train are uniformly distributed in time. That is, the output pulses generated in response to each input pulse are equally spaced and evenly distributed over the time interval between consecutive input pulses. The pulse rate multiplying circuitry includes an up/down counter incremented by pulses in the input pulse train. The up/down counter is decremented by feedback pulses generated by a feedback circuit including a digital/analog converter, a voltage controlled oscillator controlled by a counter empty detect circuit, and a divide-by-N circuit arranged in a frequency locked loop with the up/down counter. The voltage controlled oscillator generates an output pulse train having a frequency which is a selected multiple of the frequency of the input pulse train, the selected multiple being determined by the count preset into the divide-by-N circuit. The counter empty detect circuit enables the voltage controlled oscillator when a count is present in the up/down counter and disables the voltage controlled oscillator when the count in the up/down counter is zero, thereby assuring that the output pulse train has exactly the selected multiple of the number of pulses in the input pulse train. Preferably, a digitally selected filter is included in the feedback circuit between the digital/analog converter and the voltage controlled oscillator, thereby assuring that the pulses in the output pulse train are uniformly distributed in time. Other features are also disclosed.

10 Claims, 2 Drawing Figures

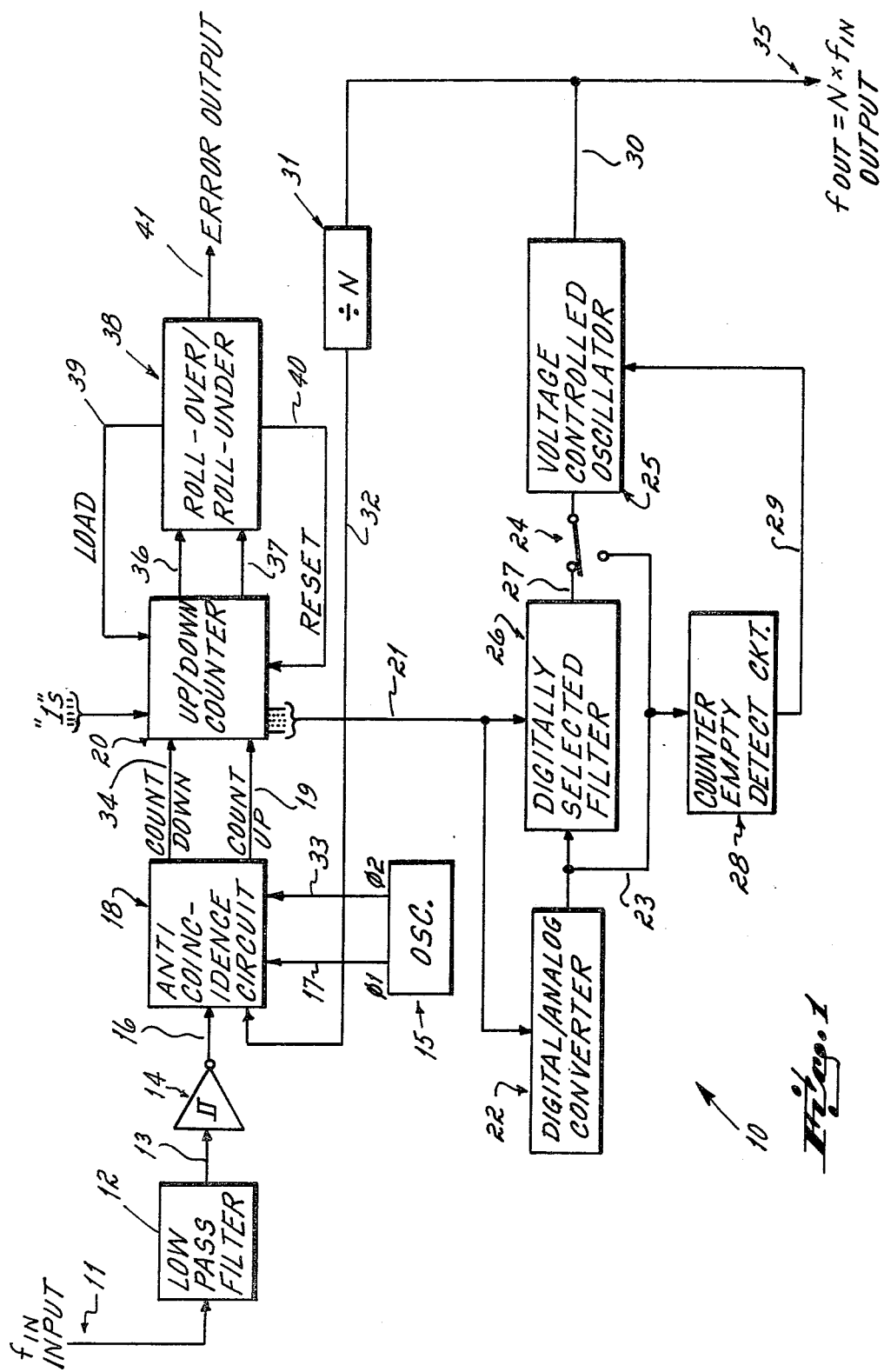

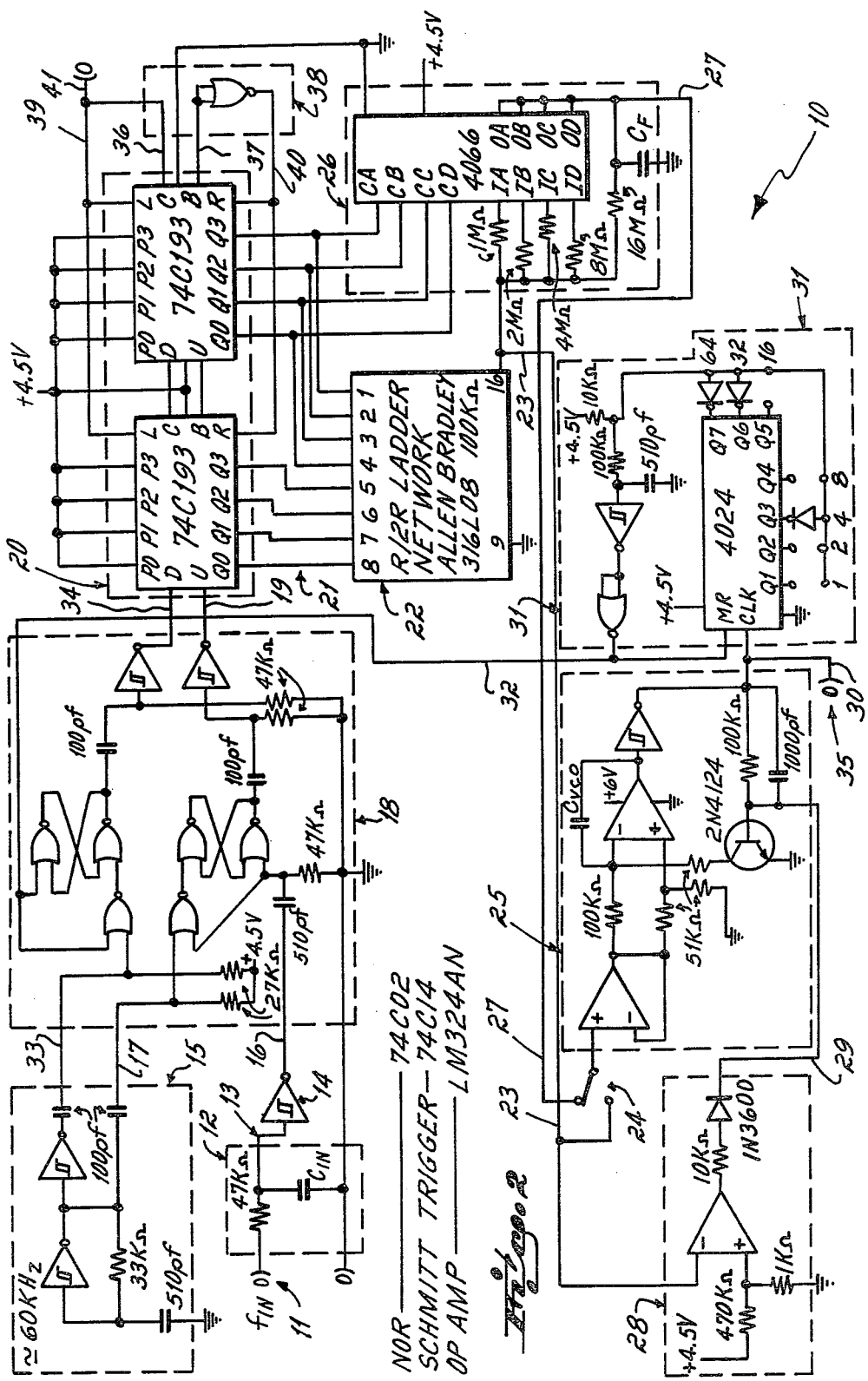

PULSE RATE MULTIPLYING CIRCUITRY

BACKGROUND OF THE INVENTION

This invention is related to the field of electrical circuits for generating output signals at a selected frequency, or repetition rate, relative to an input signal. More particularly, the invention is related to the field of electrical circuits for converting an input signal having a first frequency to an output signal having a second frequency. More particularly still, the invention is related to the field of electrical circuits for converting a first signal occurring at a relatively low frequency to a second signal occurring at a relatively high frequency which is a predetermined and selected multiple of the low frequency. Specifically, the invention is directed to frequency locked pulse rate multiplying circuitry for generating an output pulse train having a frequency which is a selected multiple of the frequency of an input pulse train, wherein the number of output pulses is exactly the selected multiple of the number of input pulses and the pulses in the output pulse train are preferably uniformly distributed in time.

A specific application of the pulse rate multiplying circuitry of the invention is in connection with increasing the resolution of a measurement signal from a fluid metering device, or flow meter. The measurement signal from a flow meter is typically a series of pulses, and each pulse represents a discrete volume of liquid or gas. The technique of multiplying the frequency of pulses generated by a pulse generator driven by a flow meter for increasing the resolution of the measurement signal is disclosed, for example, by Gass et al U.S. Pat. Nos. 3,743,946, Grob U.S. Pat. 3,745,470, and Mueller U.S. Pat. 3,808,543.

Although the use of pulse rate multiplying circuits is known for increasing the resolution of the measurement signal generated by a flow meter, known pulse rate multiplying circuits do not always operate with perfect precision. That is, known pulse rate multiplying circuits do not always generate exactly the selected multiple of the number of pulses in the input pulse train generated by the flow meter. Since the selected multiple of pulses does not appear in the output pulse train for each pulse in the input pulse train, the resulting measurement signal is not accurate. Furthermore, known pulse rate multiplying circuits generally do not generate an output pulse train having pulses uniformly distributed in time. That is, the output pulse train is a series of high frequency bursts of pulses separated in time. Consequently, the equipment connected to the pulse rate multiplying circuit must be relatively sophisticated since an extremely fast response time is required for handling bursts of output pulses at high frequency.

In the past, frequency multiplication has primarily been concerned with handling sinusoidal signals wherein harmonics of the original sinusoidal signal are generated and tuned circuits are used for selecting particular harmonics. However, when dealing with pulses, such an approach has proven unsatisfactory because a modification of the sinusoidal signals to squarewave is required. Also, variations in the original signal frequency as encountered in fluid metering render such an approach ineffective.

With the advent of digital circuitry, however, there has been some refinement of pulse rate multiplying techniques. Bauer U.S. Pat. No. 3,617,902, for example, discloses a pulse frequency multiplying circuit including flip-flops 1 and 2 which form a phase comparator for detecting the time of occurrence of each input pulse relative to the time of occurrence of each pulse generated by a divide-by-N counter 26 which counts pulses generated by a voltage controlled oscillator 10. The phase comparator determines the voltage applied by a differential integrating circuit 21 to the voltage controlled oscillator so that the voltage controlled oscillator generates pulses having a frequency which is a selected multiple of the frequency of input pulses, the multiple being determined by the count N preset into the divide-by-N counter. The Bauer circuit generates an output pulse train having a frequency which is a selected multiple of the frequency of the input pulse train and will function effectively under steady state conditions but does not always generate exactly a selected multiple of output pulses for each input pulse since there is no means for determining when the number of pulses generated by the divide-by-N counter equals the number of input pulses. Therefore, the Bauer circuit cannot be satisfactorily used where extreme accuracy is required as in the case of increasing the resolution of a measurement signal from a flow meter.

Lougheed U.S. Pat. No. 3,673,391 discloses a pulse frequency multiplying circuit including an up/down binary counter 13 incremented by input pulses and decremented by pulses generated as follows. A comparator 12 detects when the count contained in a binary counter 11 reaches the count contained in the up/down binary counter for generating a pulse which triggers a monostable circuit 15. The monostable circuit is connected to a divider 18 which is in turn connected to the up/down binary counter so that the pulses generated by the divider occur at a frequency which is dependent on the count preset into the divider. Consequently, the monostable circuit generates output pulses at a frequency which is a selected multiple of the frequency of input pulses, the multiple being determined by the count preset into the divider. Although the number of pulses in the output pulse train equals a selected multiple of the number of pulses in the input pulse train, the pulses in the output pulse train are not uniformly distributed in time. The equipment connected to the Lougheed circuit must be relatively sophisticated since an extremely fast response time is required for handling bursts of output pulses at high frequency generated by the Lougheed circuit.

Also, Kizler et at U.S. Pat. No. 3,935,538 discloses a pulse frequency multiplying circuit including digital multiplying circuitry 17 for generating an output pulse train having a frequency which is a selected multiple of the frequency of the input pulse train. The ratio between the frequency of the output pulse train and the frequency of the input pulse train is determined by the count preset into a factor set store 19. Although the number of pulses in the output pulse train is a selected multiple of the number of pulses in the input pulse train, as in the case of the Lougheed circuit, the pulses in the output pulse train are not uniformly distributed in time, and, therefore, the equipment connected to the Kizler circuit must be relatively sophisticated since an extremely fast response time is required for handling bursts of output pulses at high frequency generated by the Kizler circuit.

SUMMARY OF THE INVENTION

One objective of this invention is to provide improved pulse rate multiplying circuitry for generating an output pulse train having a number of pulses which is exactly a selected multiple of the number of pulses in the input pulse train, that is, for generating exactly a selected number of output pulses for each input pulse.

Another objective of the invention is to provide pulse rate multiplying circuitry which generates an output pulse train having a number of pulses which is exactly a selected multiple of the number of pulses in the input pulse train wherein the pulses in the output pulse train are equally spaced and evenly distributed over the time interval between consecutive input pulses rather than in bursts of high frequency pulses separated in time.

In accordance with a preferred embodiment of the invention, pulse rate multiplying circuitry is provided which is responsive to an input pulse train, whose frequency may vary, for generating an output pulse train having a number of pulses which is a selected multiple of the number of pulses in the input pulse train. That is, the pulse rate multiplying circuitry generates exactly a selected multiple of output pulses for each input pulse so that the frequency of the output pulse train is the selected multiple of the frequency of the input pulse train. Preferably, the pulses in the output pulse train are uniformly distributed in time. That is, the output pulses generated for each input pulse are equally spaced and evenly distributed over the time interval between consecutive input pulses.

The pulse rate multiplying circuitry includes an up/down counter incremented by pulses in the input pulse train. The pulses in the input pulse train may be generated by a pulse generator driven by a flow meter, for example. The up/down counter is decremented by feedback pulses generated by a feedback circuit including a digital/analog converter, a voltage controlled oscillator controlled by a counter empty detect circuit, and a divide-by-N circuit arranged in a frequency locked loop with the up/down counter. The voltage controlled oscillator generates an output pulse train having a frequency which is a selected multiple of the frequency of the input pulse train, the selected multiple being determined by the count preset into the divide-by-N circuit. The counter empty detect circuit is responsive to the count contained in the up/down counter for enabling the voltage controlled oscillator when a count is present in the up/down counter and for disabling the voltage controlled oscillator when the count contained in the up/down counter is zero, thereby assuring that the output pulse train has exactly the selected multiple of the number of pulses in the input pulse train.

Preferably, a digitally selected filter is included in the feedback circuit between the digital/analog converter and the voltage controlled oscillator. The digitally selected filter is responsive to the voltage produced by the digital/analog converter for integrating the voltage applied to the voltage controlled oscillator, thereby assuring that the pulses in the output pulse train are uniformly distributed in time.

The preferred embodiment of the pulse rate multiplying circuitry of the invention, including the up/down counter, the digital/analog converter, the digitally selected filter, the voltage controlled oscillator controlled by the counter empty detect circuit, and the divide-by-N circuit, for generating an output pulse train having a number of uniformly distributed pulses which is exactly a selected multiple of the number of input pulses has many advantages. For example, when used for increasing the resolution of a measurement signal from a flow meter, the pulse rate multiplying circuitry of the invention will provide increased resolution with perfect accuracy by generating exactly the selected multiple of pulses in the input pulse train, that is, neither more not less pulses. Consequently, when the pulses in the output pulse train are totalized, the volume of liquid or gas represented by the pulses in the output pulse train will exactly match the volume of liquid or gas represented by the pulses in the input pulse train. As a result, the accuracy of the measurement signal will be substantially the same, but the resolution of the measurement signal will be increased. Furthermore, since the pulses in the output pulse train are uniformly distributed in time, the equipment for totalizing the output pulses is not required to have an extremely fast response time for handling bursts of output pulses at high frequency.

BRIEF DESCRIPTION OF THE DRAWINGS

The features of the pulse rate multiplying circuitry of the invention will be better understood and the concomitant advantages will become clear to those skilled in the art after a consideration of the description of a preferred embodiment given below in connection with the accompanying drawings. In the drawings:

FIG. 1 is a block diagram of the preferred embodiment of the pulse rate multiplying circuitry of the invention; and FIG. 2 is a schematic diagram of a representative implementation of the pulse rate multiplying circuitry shown in FIG. 1.

DESCRIPTION OF THE PREFERRED EMBODIMENT

The preferred embodiment of the pulse rate multiplying circuitry of the invention is shown in FIG. 1 in block diagram form. As shown in FIG. 1, the pulse rate multiplying circuitry is indicated generally by the numeral 10.

Pulses in an incoming, or input, pulse train from an external source (not shown) having a frequency $f_{IN}$ appear at an input 11 of pulse rate multiplying circuitry 10. The input pulse train may be generated, for example, by a pulse generator driven by a flow meter in which case the input pulse train constitutes a measurement signal and each pulse in the input pulse train represents a discrete volume of liquid or gas measured by the flow meter. The flow meter driven pulse generator may, for example, be of the type disclosed by Rockwell Manufacturing Company Technical Data: S 351-10C, and reference is made to that publication for further information. However, pulse rate multiplying circuitry 10 is not limited to use in combination with a flow meter driven pulse generator and can, of course, be used in combination with other types of pulse sources.

As shown in FIG. 1, the input of a low pass filter 12 is preferably connected to input 11. Low pass filter 12 filters noise present in the signal at input 11.

The output of low pass filter 12 is connected by a line 13 to the input of a Schmitt trigger 14. In response to each pulse passed by low pass filter 12, Schmitt trigger 14 produces a pulse having a suitable level and shape for use by the digital circuitry included in pulse multiplying circuitry 10.

Digressing for a moment, an oscillator 15 having a $\phi1$ output and a $\phi2$ output is set to oscillate at a predetermined frequency. The predetermined oscillator frequency is higher than the maximum expected frequency of pulses in the input pulse train.

Now, the output of Schmitt trigger 14 is connected by a line 16, and the $\phi 1$ output of oscillator 15 is connected by a line 17 to respective inputs of an anti-coincidence circuit 18. One output of anti-coincidence circuit 18 is in turn connected by a line 19 to the count up input of an up/down counter 20. Anti-coincidence circuit 18 synchronizes the pulses produced by Schmitt trigger 14 with the pulses at the $\phi 1$ output of oscillator 15, thereby producing pulses which increment up/down counter 20, that is, for producing pulses which cause the up/down counter to count up. The frequency of oscillator 15 is set higher than the maximum expected frequency of pulses in the input pulse train for assuring that every pulse in the input pulse train increments up/down counter 20.

The binary outputs of up/down counter 20 are connected by lines 21 to a digital/analog (D/A) converter 22. D/A converter 22 produces a voltage which is proportional to the count contained in up/down counter 20.

The output of D/A converter 22 may be connected by a line 23 and a single-pole, double-throw switch 24 to the input of a voltage controlled oscillator 25. As shown in FIG. 1, however, the output of D/A converter 22 is preferably connected by line 23 to the input of a digitally selected filter 26 which also has inputs connected to the binary outputs of up/down counter 20 by lines 21. The output of digitally selected filter 26 is in turn preferably connected by a line 27 and switch 24 to the input of voltage controlled oscillator 25.

Switch 24 is preferably connected to line 27 at the output of digitally selected filter 26 so that the voltage produced by D/A converter 22 is integrated for de-emphasizing changes in the count contained in up/down counter 20 which are most notable when the pulses in the input pulse train occur at low frequencies. Digitally selected filter 26 is a low pass filter whose time constant is inversely proportional to the count contained in up/down counter 20 for averaging variations in the voltage produced by D/A converter 22 in response to changes in the count contained in the up/down counter. Digitally selected filter 26 is preferably included for achieving the objective of providing an output pulse train in which the pulses are uniformly distributed in time, especially when the pulses in the input pulse train occur at a relatively low frequency in comparison to when the pulses in the input pulse train occur at a relatively high frequency. At higher frequencies, the output of D/A converter 22 may be directly connected by line 23 and switch 24 to the input of voltage controlled oscillator 25, thereby eliminating the delay introduced by digitally selected filter 26.

Digressing for a moment, the output of D/A converter 22 is also connected by line 23 to the input of a counter empty detect circuit 28. The output of counter empty detect circuit 28 is connected by a line 29 to the inhibit input of voltage controlled oscillator 25. Counter empty detect circuit 28 is responsive to the count contained in up/down counter 20 for respectively enabling and disabling voltage controlled oscillator 25. That is, counter empty detect circuit 28 removes the inhibit from voltage controlled oscillator 25 when a non-zero count is contained in up/down counter 20, thereby enabling the voltage controlled oscillator. On the other hand, counter empty detect circuit 28 inhibits voltage controlled oscillator 25 when a zero count is contained in up/down counter 20, thereby disabling the voltage controlled oscillator. Counter empty detect circuit 28 is included for achieving the objective of providing exactly a selected multiple of output pulses for each input pulse.

Now, if a non-zero count is contained in up/down counter 20, D/A converter 22 produces a voltage which is proportional to the count contained in the up/down counter, and voltage controlled oscillator 25 is enabled by counter empty detect circuit 28. The voltage produced by D/A converter 22 is either aplied directly to the input of voltage controlled oscillator 25 or preferably integrated by digitally select filter 26 before being applied to the input of the voltage controlled oscillator as described above. Voltage controlled oscillator 25 generates pulses at a frequency proportional to whatever voltage is applied.

The output of voltage controlled oscillator 25 is connected by a line 30 to the input of a presettable divide-by-N circuit 31. Divide-by-N circuit 31 generates a single feedback pulse for every N pulses generated by voltage controlled oscillator 25, and the number N is determined by presetting the divide-by-N circuit.

The output of divide-by-N circuit 31 is connected by a line 32, and the $\phi 2$ output of oscillator 15 is connected by a line 33 to respective inputs of anti-coincidence circuit 18. Another output of anti-coincidence circuit 18 is in turn connected by a line 34 to the count down input of up/down counter 20. Anti-coincidence circuit 18 synchronizes the pulses produced by divide-by-N circuit 31 with the pulses at the $\phi 2$ output of oscillator 15, thereby producing pulses which decrement up/down counter 20, that is, for producing pulses which cause the up/down counter to count down.

As described above, the output of voltage controlled oscillator 25 is connected to line 30. Line 30 is connected to an output 35 of pulse rate multiplying circuitry 10.

Up/down counter 20 will settle about the count required by voltage controlled oscillator 25 for maintaining a count down frequency of feedback pulses generated by divide-by-N circuit 31 equal to the count up frequency of pulses in the input pulse train. Under frequency lock conditions, the frequency $f_{OUT}$ of pulses at output 35 of pulse rate multiplying circuitry 10 is the selected multiple N of the frequency of pulses in the input pulse train.

As shown in FIG. 1, the carry output of up/down counter 20 is connected by a line 36 to one input of a roll-over/roll-under circuit 38. Furthermore, the borrow output of up/down counter 20 is connected by a line 37 to another input of roll-over/roll-under circuit 38.

If up/down counter 20 jumps from maximum count to zero count in a case where voltage controlled oscillator 25 is unable to lock onto the frequency of pulses in the input pulse train due to over-ranging of pulse rate multiplying circuitry 10, a pulse appears at the carry output of up/down counter 20. As shown in FIG. 1, one output of roll-over/roll-under circuit 38 is connected by a line 39 to the load input of up/down counter 20. In response to a carry pulse, roll-over/roll-under circuit 38 presets up/down counter 20 to a maximum count so that pulse rate multiplying circuitry 10 generates an output pulse train having the highest possible frequency.

If the count contained in up/down counter 20 jumps from zero count to maximum count in a case where voltage controlled oscillator 25 is unable to lock onto the frequency of pulses in the input pulse train due to under-ranging pulse rate multiplying circuitry 10, a borrow pulse appears at the borrow output of the up/down counter. As shown in FIG. 1, another output of roll-over/roll-under circuit 38 is connected by a line 40 to the reset input of up/down counter 20. In response to a borrow pulse, roll-over/roll-under circuit 38 resets up/down counter 20 to a zero count.

Preferably, a further output of roll-over/roll-under circuit 38 is connected to an external error detecting means (not shown) by a line 41. Roll-over/roll-under circuit 38 preferably produces an error pulse in response to either a carry pulse or a borrow pulse produced by up/down counter 20 if the up/down counter jumps from maximum count to zero count or zero count to maximum count, respectively, in cases where voltage controlled oscillator 25 is unable to lock onto the frequency of pulses in the input pulse train due to over-ranging or under-ranging of pulse rate multiplying circuitry 10.

The pulses generated by voltage controlled oscillator 25 form the output pulse train generated by pulse rate multiplying circuitry 10 such that the frequency of the output pulse train is the selected multiple N of the frequency of the input pulse train. Exactly the selected multiple N of output pulses is generated for each input pulse, and the pulses in the output pulse train are preferably uniformly distributed in time.

The foregoing description of the preferred embodiment of the invention has been made with particular emphasis on the block circuit diagram illustrated in FIG. 1, and the function of each element shown in the block circuit diagram has been fully explained. Pulse rate multiplying circuitry 10 is susceptible to various implementations which will occur to those skilled in the art. A representative implementation for the preferred embodiment of pulse rate multiplying circuitry 10 illustrated in FIG. 1 is shown by way of example in FIG. 2 which is an exact schematic circuit diagram including specific circuits for implementing the pulse rate multiplying circuitry characterizing the invention. The same numerals are used for indicating the correspondence between the elements of pulse rate multiplying circuitry 10 in FIG. 1 and the representative implementing circuits illustrated in FIG. 2. For the most part, the values for the components used for the implementing circuits shown in FIG. 2 are indicated. The selection of certain component values, however, requires further elaboration.

As indicated earlier, low pass filter 12 is preferably included for filtering high frequency noise present in the signal at input 11. The value of capacitance $C_{IN}$ included in low pass filter 12 is selected based on the maximum expected frequency $f_{IN\ MAX}$ of the input pulse train. The value of $C_{IN}$ is approximately $10^6/f_{IN\ MAX}$ picofarads for a 50% duty cycle input pulse train.

Up/down counter 20 may have any number of bits but preferably is an eight-bit up/down counter formed by interconnecting two four-bit up/down counters as shown in FIG. 2. The number of bits in up/down counter 20 by and large determines the resolution of pulse rate multiplying circuitry 10. That is, as the number of bits in up/down counter 20 is increased and the number of corresponding conversion voltages produced by D/A converter 22 is correspondingly increased, the number of discrete voltages which may be applied to voltage controlled oscillator 25 representative of different frequencies of the input pulse train is increased. Consequently, a more precise frequency lock is achievable under steady state conditions. As a result, the frequency of the output pulse train will exhibit less variation. In any event, use of digitally selected filter 26 reaches such variations in the frequency of the output pulse train as will be explained shortly.

The value of capacitance $C_F$ included in digitally selected filter 26 is selected based on the maximum expected rate of change which the frequency of the input pulse train is expected to undergo. The time constant of digitally selected filter 26 is inversely proportional to the count contained in up/down counter 20, and the time constant of the digitally selected filter is automatically adjusted by the up/down counter for optimum averaging of the voltage produced by D/A converter 22 which is applied to voltage controlled oscillator 25. The value of $C_F$ is selected when up/down counter 20 is full for setting the time constant of digitally selected filter 26 so that the time constant equals the maximum expected rate of change in the frequency of the input pulse train. When frequency lock is achieved, the resultant frequency of the output pulse train is modulated slightly, the peak value of the modulation being inversely proportional to the count contained in up/down counter 20 multiplied by the frequency of the input pulse train multiplied by the time constant of digitally selected filter 26, that is, peak modulation is approximately equal to 1/(Count X $f_{IN}$ X Time Constant).

The time constant of digitally selected filter 26 is inversely proportional to the count contained in up/down counter 20. At high input frequencies, up/down counter 20 is relatively full, and the trimming effect of the least significant bit of the up/down counter is small, 5%, for example, if the count contained in the up/down counter is twenty. On the other hand, at low input frequenices, up/down counter 20 is almost empty, and the trimming effect of the least significant bit is large, 50%, for example, if the count contained in the up/down counter is two. However, since a proportionally longer time constant is used at low input frequencies, modulation of the output frequency remains at approximately 2-5% for a four-bit up/down counter and proportionally less for an up/down counter having a greater number of bits.

The value of the capacitance of $C_{VCO}$ included in voltage controlled oscillator 25 is selected based on the maximum frequency $f_{OUT\ MAX}$ of the output pulse train expected to be generated. Representative approximate values of $C_{VCO}$ are shown in the following table.

| $f_{OUT\ MAX}$ | $C_{VCO}$ |
| --- | --- |
| 500 Hz. | .0082 microfarads |
| 1 KHz. | .0039 microfarads |
| 2 KHz. | 2000 picofarads |
| 5 KHz. | 750 picofarads |
| 10 KHz. | 330 picofarads |

As shown in FIG. 2, divide-by-N circuit 31 includes an eight-bit binary counter, and the selected multiple N is determined by an OR gate formed by diodes connected to selected binary outputs of the binary counter. The selected multiple N can be easily chosen by appropriately arranging the diodes. As illustrated in FIG. 2, for example, three diodes are arranged for providing a selected multiple of 4+32+64=100.

As shown in FIG. 2, counter empty detect circuit 28 comprises a comparator having the inverting input connected to the output of D/A converter 22 and the non-inverting input connected to a voltage reference circuit which is adjusted for providing a preset threshold which is preferably equal to approximately one-half of the voltage produced by D/A converter 22 when up/down counter 20 changes from one count to the next count. Whenever the count contained in up/down counter 20 is one or greater, the voltage produced by D/A converter 22 exceeds the preset threshold so that the comparator produces a low level voltage which is blocked by a diode connected to the output of the comparator. Consequently, voltage controlled oscillator 25 oscillates at a frequency proportional to the voltage produced by D/A converter 22. On the other hand, whenever up/down counter 20 has a zero count, the preset threshold exceeds the voltage produced by D/A converter 22 so that the comparator produces a high level voltage which forward biases a PNP transistor included in voltage controlled oscillator 25 for clamping the voltage controlled oscillator. Consequently, oscillation of voltage controlled oscillator 25 ceases. As will be evident to those skilled in the art, counter empty detect circuit 28 may comprise logic circuitry in the form of a multiple input NOR gate having inputs connected to the binary outputs of up/down counter 20 and an output connected to the base of the PNP transistor included in voltage controlled oscillator 25 instead of the comparator illustrated in FIG. 2.

Referring to FIG. 1, the overall operation of pulse rate multiplying circuitry 10 will now be described. Pulses in the input pulse train appear at input 11. Low pass filter 12 is preferably included for filtering out high frequency noise present in the signal at input 11, thereby preventng spurious signals from affecting the operation of pulse rate multiplying circuitry 10.

In response to pulses in the input pulse train, Schmitt trigger 14 produces pulses having a suitable level and shape for use by the digital circuitry included in pulse rate multiplying circuitry 10. Anti-coincidence circuit 18 synchronizes the pulses produced by Schmitt trigger 14 with pulses at the $\phi 1$ output of oscillator 15 for incrementing up/down counter 20.

D/A converter 22 produces a voltage proportional to the count contained in up/down counter 20. If a count greater than zero is contained in up/down counter 20, counter empty detect circuit 28 enables voltage controlled oscillator 25. The voltage produces by D/A converter 22 is preferably passed through digitally selected filter 26 which is a low pass filter whose time constant is inversely proportional to the count contained in up/down counter 20. Digitally selected filter 26 averages changes in the voltage produced by D/A converter 22 so that any change in the count contained in up/down counter 20 is gradually reflected by a change in the voltage applied to voltage controlled oscillator 25 so that the pulses in the output pulse train generated by the voltage controlled oscillator are uniformly distributed in time. That is, the output pulses generated for each input pulse are equally spaced and evenly distributed over the time interval between consecutive input pulses. Digitally selected filter 26 also effectively interpolates between different discrete voltages produced by D/A converter 22 in response to a repetitive back-and-forth change in the count contained in up-down counter 20. That is, especially in the case of an output pulse train having a low frequency and/or in the case of an up/down counter 20 having a relatively small number of bits, the count contained in the up/down counter may change back and forth because the up/down counter has only a finite number of bits. However, the use of digitally selected filter 26 averages changes in the voltage produced by D/A converter 22 in response to back-and-forth changes in the count contained in up/down counter 20 so that voltage controlled oscillator 25 generates a relatively constant frequency output pulse train for any given frequency input pulse train notwithstanding the fact that the input pulse train has a low frequency or the up/down counter has a relatively small number of bits.

Divide-by-N circuit 31 generates a feedback pulse for every N pulses generated by voltage controlled oscillator 25. Anti-coincidence circuit 18 synchronizes the pulses generated by divide-by-N circuit 31 with the pulses at the $\phi 2$ output of oscillator 15 for decrementing up/down counter 20.

If the frequency of the input pulse train increases or decreases, the count contained in up/down counter 20 respectively increases or decreases until the output pulse train generated by voltage controlled oscillator 25 reaches a frequency required for maintaining the rate at which the up/down counter is decremented by pulses generated by divide-by-N circuit 31 equal to the rate at which the up/down counter is incremented by pulses in the input pulse train. The frequency of the output pulse train generated by voltage controlled oscillator 25 settles at N times the frequency of the input pulse train, since a frequency N times the frequency of the input pulse train is required by divide-by-N circuit 31 for generating feedback pulses in order for the count contained in up/down counter 20 to stabilize. Consequently, an output pulse train which is N times the frequency of the input pulse train appears at output 35 of pulse rate multiplying circuitry 10.

In the preferred embodiment of the pulse rate multiplying circuitry 10, if the frequency of pulses in the input pulse train increases or decreases, the time constant of digitally selected filter 26 is automatically adjusted for smoothing the increasing or decreasing voltage produced by D/A converter 22. Consequently, the pulses which appear in the output pulse train are uniformly distributed in time.

Roll-over/roll-under circuit 38 generates an error pulse if the count contained in up/down counter 20 jumps from maximum to zero or zero to maximum in a case where voltage controlled oscillator 25 is unable to lock onto the frequency of the input pulse train. Voltage controlled oscillator 25 continues to generate pulses until counter empty detect circuit 28 inhibits the voltage controlled oscillator when the count contained in up/down counter 20 reaches zero. Consequently, the number of output pulses generated by voltage controlled oscillator 25 will always equal exactly N times the number of pulses in the input pulse train.

The invention provides pulse rate multiplying circuitry comprising an up/down counter incremented by pulses in an input pulse train and decremented by feedback pulses generated by a feedback circuit which includes a D/A converter, a voltage controlled oscillator controlled by means of a counter empty detect circuit, and a divide-by-N circuit connected in a frequency locked loop with the up/down counter, the voltage controlled oscillator generating pulses at a frequency which is a selected multiple of the frequency of the input pulse train, the selected multiple being determined by the count preset into the divide-by-N circuit. The pulse rate multiplying circuitry of the invention accomplishes providing selectively increased resolution of low frequency input pulse trains by pulse multiplication, that is, generates exactly N output pulses for each input pulse. The up/down counter always contains the exact number of pulses required to assure complete correlation of input pulses to output pulses. The pulse rate multiplying circuitry generates an output pulse train, the frequency of which at any time is a selected multiple of the frequency of the input pulse train by recognizing that the numerical value of the count contained in the up/down counter is proportional to the frequency of the input pulse train. Preferably, the outputs of the up/down counter are also used for adjusting the time constant of a digitally selected filter included in the feedback circuit between the D/A converter and the voltage controlled oscillator. Consequently, the pulses in the output pulse train are uniformly distributed in time, and the output pulses generated in response to each input pulse are equally spaced and evenly distributed over the time interval between consecutive input pulses. As a result, a continuous train of output pulses is generated, not a series of bursts of high frequency pulses separated in time.

A preferred embodiment of the pulse rate multiplying circuitry of the invention has been described in connection with the drawings by way of example and not by way of limitation. Various modifications may appear to those skilled in the art, such as the aforementioned substitution of logic circuitry connected directly to the binary outputs of the up/down counter for detecting when the counter is empty rather than the comparator circuit described in connection with FIG. 2. Various other modifications may be apparent without departing from the spirit of the invention. Therefore, in order to ascertain the true scope of the invention, reference must be had to the appended claims.

We claim:

1. Pulse rate multiplying circuitry for generating an output pulse train having a frequency which is a selected multiple N of the frequency of an input pulse train, comprising:
    an up/down counter, said up/down counter being incremented in response to each pulse in said input pulse train;
    a digital/analog converter responsive to the count contained in said up/down counter for producing a voltage proportional to the count contained in said up/down counter;
    a voltage controlled oscillator, said voltage controlled oscillator being enabled in a first mode for generating said output pulse train having a frequency proportional to said voltage produced by said digital/analog converter, and said voltage controlled oscillator being disabled in a second mode;
    a divide-by-N circuit responsive to said output pulse train for generating a feedback pulse in response to every N pulses generated by said voltage controlled oscillator, said up/down counter being decremented in response to each said feedback pulse; and
    a counter empty detect circuit responsive to the count contained in said up/down counter for enabling said voltage controlled oscillator so that said voltage controlled oscillator is in said first mode when a count greater than zero is contained in said up/down counter and for disabling said voltage controlled oscillator so that said voltage controlled oscillator is in said second mode when a zero count is contained in said up/down counter;
    whereby said pulse rate multiplying circuitry produces exactly said selected multiple N of output pulses for each said input pulse so that the frequency of said output pulse train is said selected multiple N of the frequency of said input pulse train.

2. The pulse rate multiplying circuitry in claim 1, further comprising:
    a digitally selected filter responsive to the count contained in said up/down counter, said digitally selected filter having a time constant which is inversely proportional to the count contained in said up/down counter for averaging said voltage produced by said digital/analog converter before said voltage is applied to said voltage controlled oscillator;
    whereby said selected multiple N of output pulses generated in response to each said input pulse is equally spaced and evenly distributed over the time interval between consecutive input pulses.

3. The pulse rate multiplying circuitry in claim 1 or 2, further comprising:
    a roll-over/roll-under circuit responsive to the count contained in said up/down counter for loading said up/down counter to a maximum count if the count contained in said up/down counter jumps from maximum count to zero count and for resetting said up/down counter if the count contained in said up/down counter jumps from zero count to maximum count.

4. The pulse rate multiplying circuitry in claim 3 wherein said roll-over/roll-under circuit produces an error pulse when the count contained in said up/down counter jumps from maximum count to zero count and from zero count to maximum count.

5. Pulse rate multiplying circuitry for generating an output pulse train having a frequency which is a selected multiple N of the frequency of an input pulse train, comprising:
    an input for receiving said input pulse train;
    an up/down counter having a count up input, a count down input, and binary outputs, said count up input being connected to said input, the count contained in said up/down counter being incremented in response to each pulse in said input pulse train;
    a digital/analog converter having an input and an output, said digital/analog converter input being connected to said binary outputs, said digital/analog conver being responsive to the count contained in said up/down counter for producing a voltage proportional to the count contained in said up/down counter;
    a voltage controlled oscillator having an input, an output, and an inhibit input, said voltage controlled oscillator input being connected to said digital/analog converter output, said voltage controlled oscillator being enabled in a first mode for generating said output pulse train having a frequency proportional to said voltage produced by said digital/analog converter, and said voltage controlled oscillator being disabled in a second mode;

a divide-by-N circuit having an input and an output, said divide-by-N circuit input being connected to said voltage controlled oscillator output, said divide-by-N circuit being responsive to said output pulse train for generating a feedback pulse in response to every N pulse generated by said voltage controlled oscillator, said divide-by-N circuit output being connected to said count down input, the count contained in said up/down counter being decremented in response to each feedback pulse;

a counter empty detect circuit having an input and an output, said counter emtpy detect circuit input being connected to said digital/analog converter output, said counter empty detect circuit output being connected to said inhibit input, said counter empty detect circuit being responsive to said voltage produced by said digital/analog converter in response to the count contained in said up/down counter for enabling said voltage controlled oscillator so that said voltage controlled oscillator is in said first mode when a count greater than zero is contained in said up/down counter and for disabling said voltage controlled oscillator so that said voltage controlled oscillator is in said second mode when a zero count is contained in said up/down counter; and an output connected to said voltage controlled oscillator output for transmitting said output pulse train;

whereby said pulse rate multiplying circuitry produces exactly said selected multiple N of output pulses for each said input pulse so that the frequency of said output pulse train is said selected multiple N of the frequency of said input pulse train.

6. The pulse rate multiplying circuitry in claim 5, further comprising:

a digitally selected filter having an input, an output, and control inputs, said digitally selected filter input being connected to said digital/analog converter output, said digitally selected filter output being connected to said voltage controlled oscillator input, and said control inputs being connected to said binary outputs, said digitally selected filter being responsive to the count contained in said up/down counter, said digitally selected filter having a time constant which is inversely proportional to the count contained in said up/down counter for averaging said voltage produced by said digital/analog converter before said voltage is applied to said voltage controlled oscillator;

whereby said selected multiple N of output pulses generated in response to each said input pulse is equally spaced and evenly distributed over the time interval between consecutive input pulses.

7. The pulse rate multiplying circuitry in claim 5 or 6 wherein said up/down counter has a carry output, a borrow output, a load input, and a reset input, further comprising:

a roll-over/roll-under circuit having one input, another input, one output, and another output, said one roll-over/roll-under circuit input being connected to said carry output, said another roll-over/roll-under circuit input being connected to said borrow output, said one roll-over/roll-under circuit output being connected to said load input, said another roll-over/roll-under circuit output being connected to said reset input, said roll-over/roll-under circuit being responsive to the count contained in said up/down counter for loading said up/down counter to a maximum count if the count contained in said up/down counter jumps from maximum count to zero count and for resetting said up/down counter if the count contained in said up/down counter jumps from zero count to maximum count.

8. The pulse rate multiplying circuitry in claim 7 wherein said roll-over/roll-under circuit has an error output, and said roll-over/roll-under circuit produces an error pulse at said error output when the count contained in said up/down counter jumps from maximum count to zero count and from zero count to maximum count.

9. Pulse rate multiplying circuitry for generating an output pulse train having a frequency which is a selected multiple N of the frequency of an input pulse train, comprising:

an up/down counter, the count contained in said up/down counter being incremented in response to each pulse in said input pulse train; and a feedback circuit, including:

(a) a digital/analog converter responsive to the count contained in said up/down counter for producing a voltage proportional to the count contained in said up/down counter;

(b) a voltage controlled oscillator operative when enabled for generating said output pulse train having a frequency proportional to the voltage applied by said digital/analog converter and inoperative when disabled;

(c) a divide-by-N circuit responsive to said output pulse train for generating a feedback pulse in response to every N pulses generated by said voltage controlled oscillator, the count contained in said up/down counter being decremented in response to each said feedback pulse; and (d) a counter empty detect circuit responsive to the count contained in said up/down counter for enabling said voltage controlled oscillator when a count greater than zero is contained in said up/down counter and for disabling said voltage controlled oscillator when a zero count is contained in said up/down counter;

whereby said pulse rate multiplying circuitry generates exactly said selected multiple N of output pulses for each input pulse so that the frequency of said output pulse train is said selected multiple N of the frequency of said input pulse train.

10. The pulse rate multiplying circuitry in claim 9, said feedback circuit further including:

(e) a digitally selected filter responsive to the count contained in said up/down counter, said digitally selected filter having a time constant which is inversely proportional to the count contained in said up/down counter for averaging said voltage produced by said digital/analog converter before said voltage is applied to said voltage controlled oscillator;

whereby said selected multiple N of output pulses generated in response to each said input pulse is equally spaced and evenly distributed over the time interval between consecutive input pulses.

* * * * *

UNITED STATES PATENT AND TRADEMARK OFFICE
CERTIFICATE OF CORRECTION

PATENT NO. : 4,331,924
DATED : May 25, 1982
INVENTOR(S) : K. D. Elliott et al

It is certified that error appears in the above—identified patent and that said Letters Patent is hereby corrected as shown below:

At column 2, line 51, "et at" should be --et al--.

At column 5, line 45, "forachiev-" should be --for achiev---.

At column 8, line 8, "reaches" should be --reduced--.

At column 9, line 51, "produces" should be --produced--.

At column 10, line 2, "output" should be --input--.

At column 12, line 56, "conver" should be --converter--.

At column 13, line 6, "pulse" should be --pulses--.

Signed and Sealed this

Twelfth Day of October 1982

[SEAL]

Attest:

GERALD J. MOSSINGHOFF

Attesting Officer    Commissioner of Patents and Trademarks